United States Patent
Awoniyi-Oteri et al.

(10) Patent No.: US 12,289,745 B2
(45) Date of Patent: Apr. 29, 2025

(54) USER EQUIPMENT EXTENDED REALITY INFORMATION-BASED BEAM MANAGEMENT

(71) Applicant: QUALCOMM Incorporated, San Diego, CA (US)

(72) Inventors: Olufunmilola Omolade Awoniyi-Oteri, San Diego, CA (US); Yan Zhou, San Diego, CA (US); Tao Luo, San Diego, CA (US); Jelena Damnjanovic, Del Mar, CA (US); Wanshi Chen, San Diego, CA (US); Wooseok Nam, San Diego, CA (US); Junyi Li, Fairless Hills, PA (US); Ozcan Ozturk, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 17/444,875

(22) Filed: Aug. 11, 2021

(65) Prior Publication Data
US 2023/0052328 A1 Feb. 16, 2023

(51) Int. Cl.
*H04W 72/51* (2023.01)
*G06F 3/01* (2006.01)
*G06N 20/00* (2019.01)
*H04B 7/0404* (2017.01)
*H04B 7/06* (2006.01)
*H04B 7/08* (2006.01)
*H04B 17/318* (2015.01)
(Continued)

(52) U.S. Cl.
CPC .......... *H04W 72/51* (2023.01); *H04W 16/28* (2013.01); *H04W 72/046* (2013.01)

(58) Field of Classification Search
CPC ................. H04W 72/51; H04W 16/28; H04W 72/046; H04B 7/0691; H04B 7/0695; H04B 7/0404
See application file for complete search history.

(56) References Cited

U.S. PATENT DOCUMENTS 8,797,358 B1 8/2014 Tseng
10,701,661 B1 * 6/2020 Coelho ................. H04W 4/023
(Continued)

OTHER PUBLICATIONS

International Search Report and Written Opinion—PCT/US2022/073550—ISA/EPO—Nov. 28, 2022.
(Continued)

*Primary Examiner* — Harry H Kim
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may obtain orientation information associated with the UE. The orientation information may indicate a rotational movement of the UE. The UE may transmit an indication of a beam associated with a predicted orientation of the UE, wherein the predicted orientation of the UE is based at least in part on the orientation information. The UE may receive an updated beam or measurement configuration based at least in part on the indication. Numerous other aspects are described.

30 Claims, 9 Drawing Sheets

(51) Int. Cl.
*H04L 67/131* (2022.01)
*H04W 16/28* (2009.01)
*H04W 72/044* (2023.01)
*H04W 72/1268* (2023.01)
*H04W 72/21* (2023.01)
*H04W 72/23* (2023.01)

(56) References Cited

U.S. PATENT DOCUMENTS

| | | | |
|---|---|---|---|
| 11,190,953 B2* | 11/2021 | He | H04B 7/0695 |
| 2013/0196681 A1* | 8/2013 | Poduri | H04W 64/00 |
| | | | 455/456.1 |
| 2018/0173372 A1* | 6/2018 | Greenspan | G06F 16/2465 |
| 2018/0227024 A1 | 8/2018 | Xia et al. | |
| 2018/0301125 A1* | 10/2018 | Haraden | G06F 12/0862 |
| 2019/0306726 A1 | 10/2019 | Mo et al. | |
| 2019/0310472 A1* | 10/2019 | Schilt | G06F 3/015 |
| 2019/0339416 A1* | 11/2019 | Elkabetz | G01W 1/10 |
| 2020/0162140 A1 | 5/2020 | Tusi et al. | |
| 2020/0374863 A1* | 11/2020 | Lin | H04W 72/046 |
| 2022/0057922 A1* | 2/2022 | Wang | G06F 1/1626 |
| 2022/0210781 A1* | 6/2022 | Farag | H04W 72/542 |
| 2022/0255611 A1* | 8/2022 | Chavva | H04B 17/318 |
| 2022/0284681 A1* | 9/2022 | Im | G06F 3/012 |
| 2023/0189245 A1* | 6/2023 | Alfarhan | H04L 1/1854 |
| | | | 370/329 |
| 2023/0246698 A1* | 8/2023 | Bastani | H04B 7/0695 |
| | | | 370/310 |

OTHER PUBLICATIONS

Partial International Search Report—PCT/US2022/073550—ISA/EPO—Oct. 7, 2022.

* cited by examiner

USER EQUIPMENT EXTENDED REALITY INFORMATION-BASED BEAM MANAGEMENT

FIELD OF THE DISCLOSURE

Aspects of the present disclosure generally relate to wireless communication and to techniques and apparatuses for user equipment (UE) extended reality (XR) information-based beam management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining orientation information associated with the UE. A pose of the UE may include location information associated with the UE and the orientation information. The method may include transmitting an indication of a beam associated with a predicted orientation of the UE, wherein the predicted orientation of the UE is based at least in part on the orientation information. The method may include receiving an updated beam or measurement configuration based at least in part on the indication.

Some aspects described herein relate to a method of wireless communication performed by a UE. The method may include obtaining orientation information associated with the UE. A pose of the UE may include location information associated with the UE and the orientation information. The method may include changing from a first beam to a second beam based at least in part on a predicted orientation of the UE, wherein the predicted orientation of the UE is based at least in part on the orientation information. The method may include communicating via the second beam based at least in part on changing from the first beam to the second beam.

Some aspects described herein relate to a UE for wireless communication. The UE may include a memory and one or more processors coupled to the memory. The one or more processors may be configured to obtain orientation information associated with the UE. A pose of the UE may include location information associated with the UE and the orientation information. The one or more processors may be configured to transmit an indication of a beam associated with a predicted orientation of the UE, wherein the predicted orientation of the UE is based at least in part on the orientation information. The one or more processors may be configured to receive an updated beam or measurement configuration based at least in part on the indication.

Some aspects described herein relate to a UE for wireless communication. The UE may include a memory and one or more processors coupled to the memory. The one or more processors may be configured to obtain orientation information associated with the UE. A pose of the UE may include location information associated with the UE and the orientation information. The one or more processors may be configured to change from a first beam to a second beam based at least in part on a predicted orientation of the UE, wherein the predicted orientation of the UE is based at least in part on the orientation information. The one or more processors may be configured to communicate via the second beam based at least in part on changing from the first beam to the second beam.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to obtain orientation information associated with the UE. A pose of the UE may include location information associated with the UE and the orientation information. The set of instructions, when executed by one or more processors of the one or more instructions that, when executed by one or more processors of a UE, may cause the one or more instructions that, when executed by one or more processors of a UE to transmit an indication of a beam associated with a predicted orientation of the UE, wherein the predicted orientation of the UE is based at least in part on the orientation information. The set of instructions, when executed by one or more processors of the one or more instructions that, when executed by one or more processors of a UE, may cause the one or more instructions that, when executed by one or more processors of a UE to receive an updated beam or measurement configuration based at least in part on the indication.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to obtain orientation information associated with the UE. A pose of the UE may include location information associated with the UE and the orientation information. The set of instructions, when executed by one or more processors of the one or more instructions that, when executed by one or more processors of a UE, may cause the one or more instructions that, when executed by one or more processors of a UE to change from a first beam to a second beam based at least in part on a predicted orientation of the UE, wherein the predicted orientation of the UE is based at least in part on the orientation information. The set of instructions, when executed by one or more processors of the one or more instructions that, when executed by one or more processors of a UE, may cause the one or more instructions that, when executed by one or more processors of a UE to communicate via the second beam based at least in part on changing from the first beam to the second beam.

Some aspects described herein relate to an apparatus of a UE for wireless communication. The apparatus may include means for obtaining orientation information associated with the UE. A pose of the UE may include location information associated with the UE and the orientation information. The apparatus may include means for transmitting an indication of a beam associated with a predicted orientation of the UE, wherein the predicted orientation of the UE is based at least in part on the orientation information. The apparatus may include means for receiving an updated beam or measurement configuration based at least in part on the indication.

Some aspects described herein relate to an apparatus of a UE for wireless communication. The apparatus may include means for obtaining orientation information associated with the UE. A pose of the UE may include location information associated with the UE and the orientation information. The apparatus may include means for changing from a first beam to a second beam based at least in part on a predicted orientation of the UE, wherein the predicted orientation of the UE is based at least in part on the orientation information. The apparatus may include means for communicating via the second beam based at least in part on changing from the first beam to the second beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
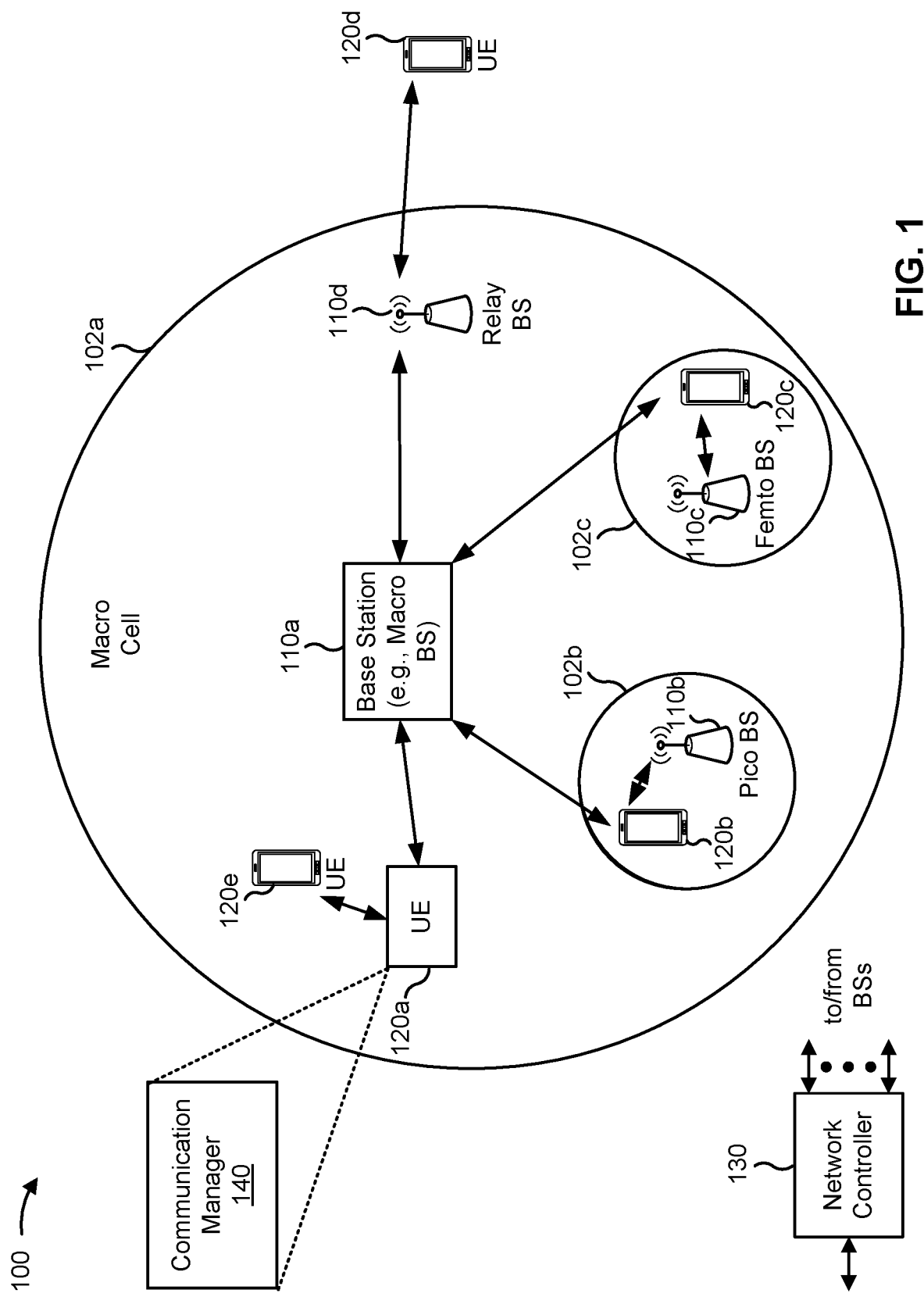
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet), a head-mounted display), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with UE orientation-based beam updating. Additionally, or alternatively, the communication manager 140 may perform one or more other operations described herein.

As indicated above, FIG. 1 is provided as an example. Other examples may differ from what is described with regard to FIG. 1.

Figure 2:
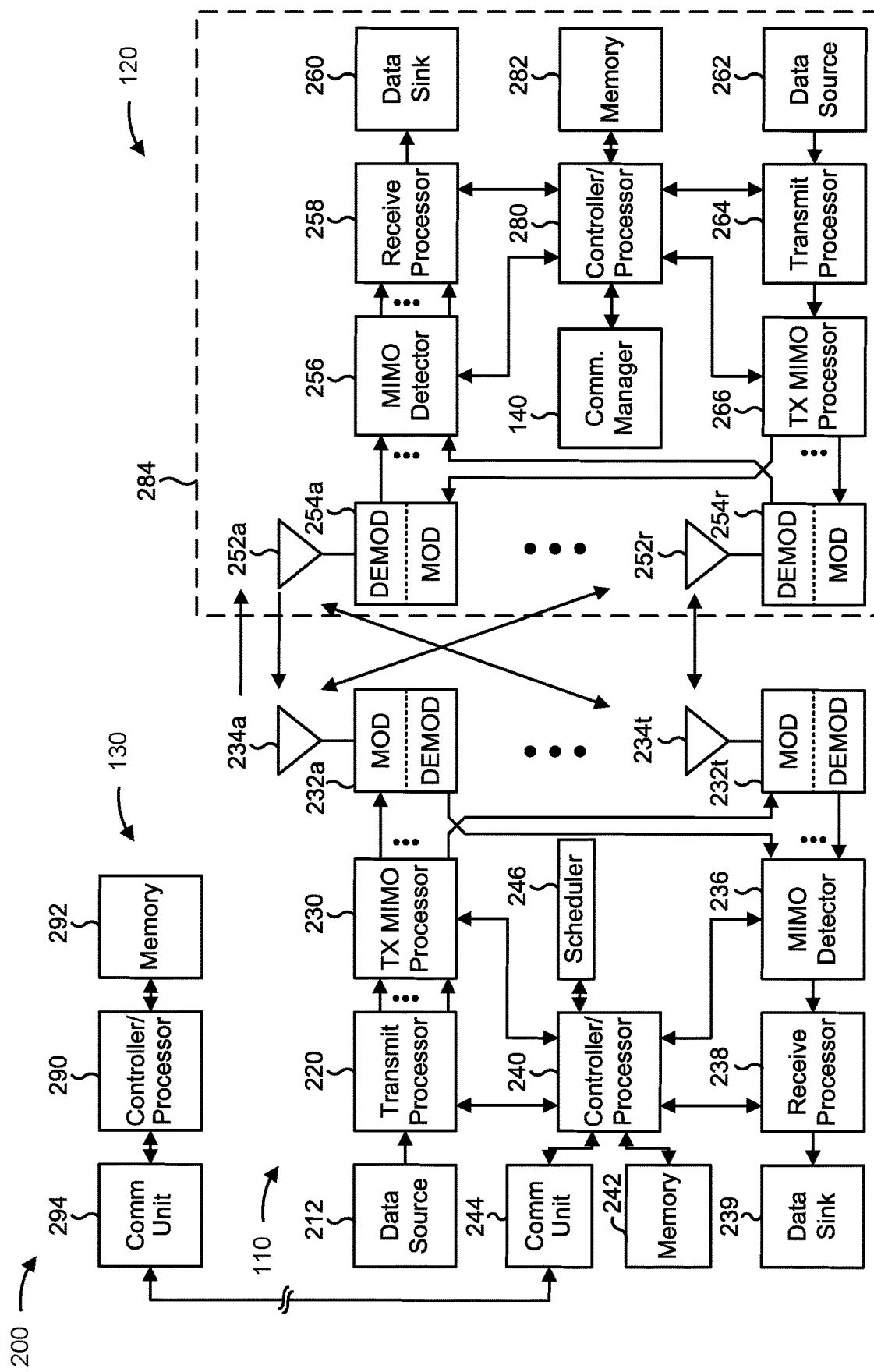
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with UE orientation-based beam updating, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for obtaining orientation information associated with the UE (e.g., using controller/processor 280, memory 282, or the like), wherein a pose of the UE includes location information associated with the UE and the orientation information; means for transmitting an indication of a beam associated with a predicted orientation of the UE (e.g., using controller/processor 280, transmit processor 264, TX MIMO processor 266, modem 254, antenna 252, memory 282, or the like), wherein the predicted orientation of the UE is based at least in part on the orientation information; and/or means for receiving an updated beam or measurement configuration based at least in part on the indication (e.g., using antenna 252, modem 254, MIMO detector 256, receive processor 258, controller/processor 280, memory 282, or the like).

In some aspects, the UE includes means for obtaining orientation information associated with the UE (e.g., using controller/processor 280, memory 282, or the like), wherein a pose of the UE includes location information associated with the UE and the orientation information; means for changing from a first beam to a second beam based at least in part on a predicted orientation of the UE (e.g., using controller/processor 280, receive processor 258, MIMO detector 256, transmit processor 264, TX MIMO processor 266, modem 254, antenna 252, memory 282, or the like), wherein the predicted orientation of the UE is based at least in part on the orientation information; and/or means for communicating via the second beam based at least in part on changing from the first beam to the second beam (e.g., using controller/processor 280, receive processor 258, MIMO detector 256, transmit processor 264, TX MIMO processor 266, modem 254, antenna 252, memory 282, or the like).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Extended reality (XR) traffic is increasingly being transmitted using cellular networks and is expected to be transmitted using 5G NR FR2 (e.g., millimeter wave) networks. XR traffic may include augmented reality (AR) traffic, mixed reality (MR) traffic, and/or virtual reality (VR) traffic.

A UE, such as associated with a head-mounted display (HMD), may receive XR traffic from a server, such as an application server. The UE may receive the XR traffic from the server via a base station. For example, the UE may periodically transmit orientation information to the server via the base station. The orientation information may indicate a pose, a position, a movement, or a rotation of the UE based at least in part on a head movement or rotation or a body movement or rotation of a user associated with the UE. The server may generate XR traffic associated with a rendered scene based at least in part on the orientation information. The server may transmit the XR traffic to the UE via the base station. In this case, an XR application executing on the UE may be a split-rendering XR application, such that scenes may be rendered at the server and transmitted to the UE (as opposed to scenes being rendered at the UE itself), which may reduce power and processor resource consumption at the UE.

The UE may transmit measurement reports to the base station, and the base station may trigger beam and/or measurement updates for the UE based at least in part on the measurement reports. However, in some cases, the movement or rotation of the UE may impact the performance of the UE. For example, the UE may be an untethered HMD using FR2. A group of one or more antennas may be mounted on the HMD. The movement or rotation of the user's head, and therefore the HMD, may cause the beams of the HMD to become unaligned with the beams of the base station which may impact the performance of the HMD until beam and/or measurement updates are received by the UE and a beam change is performed. This may introduce latency and decrease throughput.

Some techniques and apparatuses described herein enable a UE to request or perform a beam change based at least in part on a predicted orientation of the UE. The predicted orientation of the UE may indicate a predicted orientation of the UE at a future time. As mere examples, the predicted orientation of the UE may indicate a predicted orientation of the UE at a time corresponding to 25 ms, 50 ms, or 100 ms from a time at which orientation information used to determine the predicted orientation is obtained. The orientation information may indicate a current orientation (e.g., a current position, movement, or rotation) of the UE or a rate of change of an orientation of the UE. In some aspects, the orientation information may indicate a past orientation of the UE.

In some aspects, the UE may determine beam information associated with the predicted orientation. In some aspects, the beam information may indicate a performance associated with communicating via a beam while the UE is oriented in the predicted orientation. In some aspects, the beam information may indicate a beam that is expected to provide a threshold performance while the UE is oriented in the predicted orientation. In some aspects, the UE may determine the predicted orientation and/or the beam information based at least in part on a table mapping the predicted orientation and the beam information. Alternatively, and/or additionally, the UE may determine the predicted orientation and/or the beam information based at least in part on providing the orientation information indicating the current orientation of the UE as an input to a model. The model may generate an output indicating the predicted orientation and/or the beam information based at least in part on the orientation information. The UE may determine whether a beam change is required based at least in part on the predicted orientation and/or the beam information. The UE may request and/or perform a beam change when the beam information indicates a degradation of the performance of the UE at the predicted orientation. As a result, the UE may proactively change beams in accordance with the change in orientation of the UE, which may enable the beams of the UE to remain aligned with the beams of the base station thereby preventing a degradation of a performance of the UE.

Figure 3:
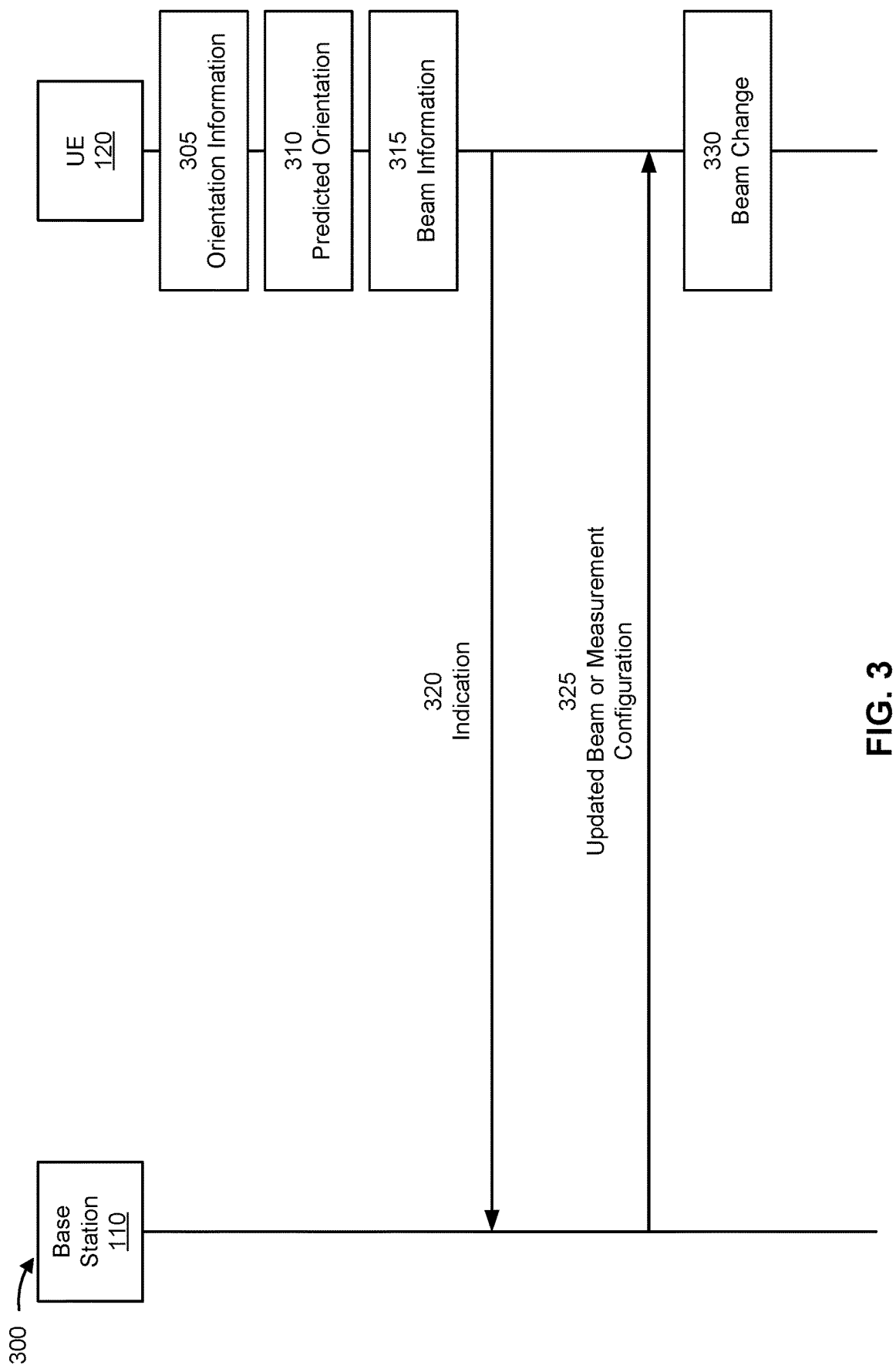
FIGS. 3 and 4 are diagrams illustrating examples associated with UE extended reality (XR) information-based beam management, in accordance with the present disclosure.

FIG. 3 is a diagram illustrating an example 300 associated with UE XR information-based beam management, in accordance with the present disclosure. As shown in FIG. 3, a base station 110 and a UE 120 may communicate with one another. In some aspects, the base station 110 and the UE 120 may be included in a wireless network, such as wireless network 100.

As shown by reference number 305, the UE 120 may obtain orientation information. The orientation information may indicate a current orientation of the UE (e.g., a current position, movement, or rotation of the UE 120 at an initial time) or a rate of change of the orientation of the UE.

In some aspects, the orientation information indicates a three degrees-of-freedom (3-DOF) pose. The 3-DOF pose may indicate a 3-DOF position and orientation of the UE 120 (e.g., a user of the UE 120) based at least in part on detecting rotational movement of the UE 120. In some aspects, the UE 120 is an HMD, and the orientation information indicates a 3-DOF pose corresponding to an orientation of a head of a user.

In some aspects, the orientation information indicates a six degrees-of-freedom (6-DOF) pose. The 6-DOF pose may indicate a 6-DOF position and orientation of the UE 120 (e.g., a user of the UE 120) based at least in part on detecting rotational movement and translational movement of the UE 120. In some aspects, the UE 120 is an HMD, and the orientation information indicates a 6-DOF pose corresponding to an orientation of a head of a user.

In some aspects, the UE 120 detects the rotational movement or the translational movement of the UE 120 based at least in part on image data obtained by a camera associated with the UE 120, acceleration data obtained by an accelerometer associated with the UE 120, or gyroscope data obtained by a gyroscope associated with the UE 120, among other examples. The UE 120 may align or fuse the accelerometer data and/or the gyroscope data with features of the image data and may generate the orientation information indicating the 3-DOF pose or the 6-DOF pose based at least in part on the aligned or fused data.

As shown by reference number 310, the UE 120 may determine a predicted orientation of the UE 120. The predicted orientation of the UE 120 may correspond to a predicted position, movement, or rotation of the UE 120 at a future time (e.g., a time subsequent to the initial time). In some aspects, the future time may be a time occurring about 25 ms after the initial time. In some aspects, the future time may be a time occurring about 100 ms after the initial time. In some aspects, the future time may be preconfigured (e.g., by the UE 120 or the base station 110).

In some aspects, the future time may be determined dynamically based at least in part on the orientation information. For example, the future time may correspond to a first future time based at least in part on the orientation information indicating a first rate of change of the orientation of the UE 120. The future time may correspond to a second future time that is subsequent to the first future time based at least in part on the orientation information indicating a second, slower rate of change of the orientation of the UE 120.

In some aspects, the UE 120 may determine the predicted orientation based at least in part on a metric associated with an application executing on the UE 120. For example, the application may be an XR application that enables the user to view a virtual world from a fixed point, and the UE 120 may determine the predicted orientation based at least in part on the user viewing the virtual world from the fixed point (e.g., the UE 120 may determine the predicted orientation based at least in part on the rotational movement of the UE 120).

As another example, the application may be an XR application that enables the user to move freely within a virtual world, and the UE 120 may determine the predicted orientation based at least in part on the user being able to move freely within the virtual world. For example, the UE 120 may determine the predicted orientation based at least in part on the rotational movement and the translational movement of the UE 120.

In some aspects, the UE 120 may utilize a model to determine the predicted orientation of the UE 120. In some aspects, the model may include a data structure, such as a lookup table. The data structure may map current orientation information or rates of change of orientation to predicted orientations.

In some aspects, the UE 120 may determine the mapping of the current orientation information or the rates of change of orientation to the predicted orientations based at least in part on historical orientation information. The historical orientation information may indicate a series of orientations or rates of changes of orientations of the UE 120 over multiple time periods. The UE 120 may determine the mapping of the current orientation information or the rates of change of orientation to the predicted orientations based at least in part on the series of orientations or rates of changes of orientations of the UE 120 over the multiple time periods.

As an example, the UE 120 may determine a quantity of times that the UE 120 moves from a first orientation to a second orientation based at least in part on the series of orientations or rates of changes of orientations of the UE 120 over the multiple time periods. The UE 120 may map the first orientation to the second orientation when the quantity of times that the UE 120 moves from the first orientation to the second orientation satisfies a threshold.

In some aspects, the model may include an artificial intelligence (AI) model, such as a machine learning model. The AI model may receive the orientation information as an input and may generate an output indicating a predicted orientation of the UE 120. In some aspects, the AI model may be trained based at least in part on historical orientation information. The AI model may be trained to determine, based at least in part on orientation information indicating a current orientation of the UE 120, a predicted orientation of the UE 120 and a confidence score that reflects a measure of confidence that the predicted orientation is accurate for the current orientation of the UE 120. In some aspects, the AI model may be trained as described elsewhere herein, such as described below with respect to FIG. 5. In some aspects, the AI model may be trained by the UE 120. Alternatively, and/or additionally, the AI model may be trained by another device (e.g., base station 110 or a server device associated with the UE 120), and the UE 120 may obtain the trained AI model from the other device.

In some aspects, the UE 120 may determine a plurality of predicted orientations based at least in part on the orientation information. The UE 120 may determine the plurality of predicted orientations in a manner similar to that described elsewhere herein.

As shown by reference number 315, the UE 120 may determine beam information associated with the predicted orientation. In some aspects, the beam information may indicate a predicted performance, at the predicted orientation, of a beam currently utilized by the UE 120 relative to a performance of the beam at a current orientation of the UE 120. For example, the beam information may indicate whether the movement of the UE 120 to the predicted orientation is likely to cause a degradation in an uplink channel, a downlink channel, a transmission configuration indicator (TCI) state, or a spatial relationship associated with the beam. In some aspects, the beam information may indicate a predicted change in an RSRP measurement, a predicted change in an error rate (e.g., a packet error rate (PER)), or another predicted change in a metric indicating a change in a performance of the beam based at least in part on the UE 120 moving to the predicted orientation.

In some aspects, the beam information may indicate a predicted performance, at the predicted orientation, of a plurality of beams. For example, the base station 110 may utilize radio resource control (RRC) signaling to configure up to 128 TCI states for a physical downlink shared channel (PDSCH) and up to 64 TCI states for a physical downlink control channel (PDCCH). Each configured TCI state may be associated with a respective transmit beam. The base station 110 may transmit a media access control-control element (MAC-CE) activating one or more of the TCI states. The beam information may indicate a predicted performance, at the predicted orientation, for each beam associated with the one or more activated TCI states. In some aspects, the base station 110 may include a plurality of TRPs, and the UE 120 may determine beam information associated with beams associated with the plurality of TRPs.

In some aspects, the UE 120 may determine the predicted performance of a beam at the predicted orientation based at least in part on a codebook received from the base station 110. The codebook may include beam layout information, beam width information, and beam orientation information, among other examples, associated with a plurality of beams.

In some aspects, the UE 120 may determine the predicted performance of a beam at the predicted orientation based at least in part on an antenna configuration of the base station 110. For example, the UE 120 may receive (e.g., from the base station 110) antenna configuration information indicating a configuration of one or more antennas of the base station 110. The UE 120 may determine the predicted performance of the beam at the predicted orientation based at least in part on the configuration of the one or more antennas of the base station 110.

In some aspects, the UE 120 may utilize a model to determine the beam information. In some aspects, the model may include a data structure (e.g., a database, a table, or a list, among other examples) storing information indicating orientations of the UE 120 and metrics associated with communicating via particular beams associated with the orientations. The UE 120 may generate a mapping between the orientations of the UE 120 and the particular beams based at least in part on the metrics. For example, the UE 120 may determine a beam associated with a highest performance relative to other beams at a particular orientation of the UE 120 based at least in part on the metrics. In some aspects, the orientations, a rate of change of an orientation of the UE 120, or beam information (e.g., the metrics or information identifying the particular beams) are used as indexes into the data structure.

The UE 120 may map the beam to the particular orientation of the UE 120 based at least in part the beam being associated with the highest performance relative to the other beams. The UE 120 may determine a beam to be utilized at the predicted orientation based at least in part on the beam being mapped to an orientation of the UE 120 corresponding to the predicted orientation.

In some aspects, the model may include an AI model. The AI model may receive the predicted orientation as an input and may generate an output indicating a beam to be utilized at the predicted orientation, a TCI state associated with the predicted orientation, or predicted beam information indicating a performance, at the predicted orientation, of one or more beams. In some aspects, the AI model may be trained based at least in part on historical orientation information and historical beam information. The AI model may be trained to determine, based at least in part on a predicted orientation a beam to be utilized at the predicted orientation, a TCI state associated with the predicted orientation, or predicted beam information indicating a performance, at the predicted orientation, of one or more beams and a confidence score that reflects a measure of confidence that the beam is accurate for the predicted orientation of the UE 120.

In some aspects, the AI model may be trained based at least in part UE 120 and base station 110 antenna mapping using angle of arrival estimation.

In some aspects, the AI model may be trained as described elsewhere herein, such as described below with respect to FIG. 5. In some aspects, the AI model may be trained by the UE 120. Alternatively, and/or additionally, the AI model may be trained by another device (e.g., base station 110 or a server device associated with the UE 120), and the UE 120 may obtain the trained AI model from the other device.

In some aspects, the trained AI model may be updated (e.g., retrained) based at least in part on orientation information associated with the UE 120 and based at least in part on one or more metrics associated with communicating via particular beams associated with orientations indicated by the orientation information. The UE 120 may obtain orientation information indicating orientations of the UE 120 and metrics associated with communicating via particular beams associated with the orientations. The UE 120 may utilize the orientation information and the metrics to update or retrain the AI model.

In some aspects, the UE 120 may determine a plurality of beams associated with a plurality of predicted orientations. The UE 120 may determine the plurality of beams in a manner similar to that described elsewhere herein.

Figure 4:
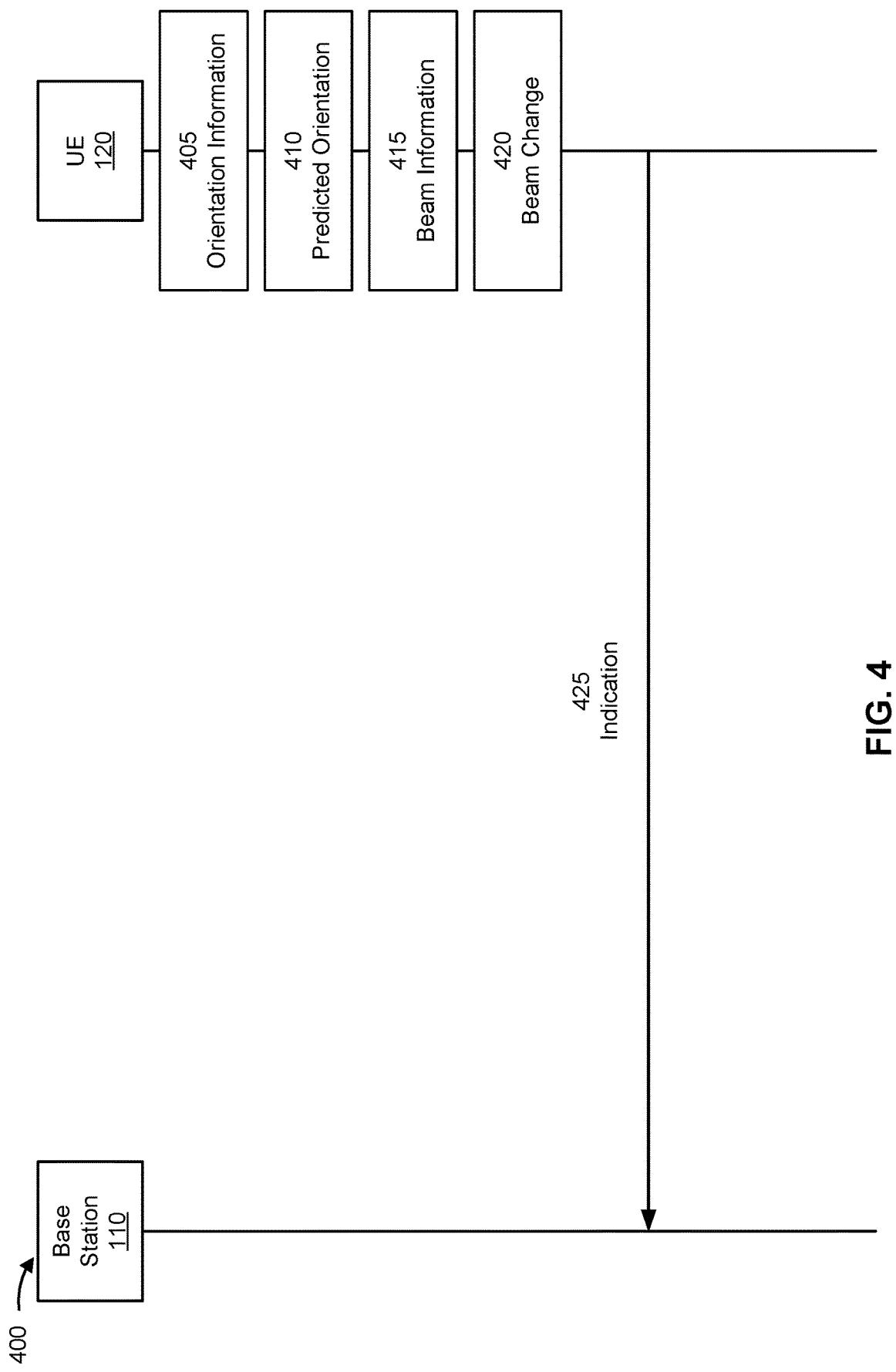

In some aspects, the UE 120 changes from a current beam to the beam associated with the predicted orientation based at least in part on determining the beam associated with the predicted orientation, as described elsewhere herein and with respect to FIG. 4.

As shown by reference number 320, the UE 120 may transmit, and the base station 110 may receive, an indication of a beam associated with the predicted orientation of the UE 120. In some aspects, the indication of the beam may include an identifier associated with the beam, an indication of a TCI state associated with the beam, or information indicating the future time (e.g., a time at which the UE 120 is to perform the beam change or a time associated with the predicted orientation), among other examples.

In some aspects, the indication of the beam includes an indication of a group of beams. For example, the indication of the beam may include an indication of a group of TCI states activated or configured by the base station 110. In some aspects, the group of TCI states are ordered based at least in part on a predicted performance, at the predicted orientation, of each beam associated with the group of TCI states relative to other beams associated with the group of TCI states. For example, a TCI state associated with a beam having a lowest predicted PER at the predicted orientation relative to other beams associated with other TCI states may be ordered first in a listing of the group of TCI states.

In some aspects, the group of beams may be associated with respective times at which the UE 120 is to change from a current beam to a beam included in the group of beams. For example, the UE 120 may determine a first predicted orientation associated with a first future time, a second predicted orientation associated with a second future time, and a third predicted orientation associated with a third future time based at least in part on the orientation information. The indication may indicate that the UE 120 is to change to a first beam at the first future time, a second beam at the second future time, and a third beam at the third future time.

In some aspects, the indication of the beam is transmitted via dedicated signaling. For example, the indication of the beam may be transmitted via a physical uplink control channel (PUCCH) format associated with transmitting the indication of the beam, via one or more fields added to, or included in, a scheduling request message, or one or more fields added to, or included in, a beam report. In some aspects, the one or more fields added to, or included in, the scheduling request message or the beam report may include a field indicating one or more TCI states, or a field indicating whether the one or more TCI states are ordered based at least in part on one or more metrics associated with the one or more TCI states, a field indicating one or more beams associated with the predicted orientation, or a field indicating whether the one or more beams are ordered based at least in part on one or more metrics associated with the one or more beams, a field indicating a time associated with changing from a current beam to the beam associated with the predicted orientation, or a field indicating a TRP associated with the base station 110.

In some aspects, the dedicated signaling may be configured to be transmitted periodically. In some aspects, the dedicated signaling may be configured to be transmitted aperiodically (e.g., based at least in part on the UE 120 determining beam information indicating a degradation in a performance of a current beam being utilized by the UE 120).

As shown by reference number 325, the base station 110 may transmit, and the UE 120 may receive, an updated beam or measurement configuration based at least in part on the indication. In some aspects, the updated beam or measurement configuration is associated with beam switching or antenna panel switching at the UE 120. The beam switching may be associated with switching a downlink or uplink TCI state for the UE 120. In some aspects, the updated beam or measurement configuration is associated with a change in a number of beams to be measured by the UE 120 in a downlink or an uplink. In some aspects, the updated beam or measurement configuration is associated with measurement signals transmitted by the base station 110 to the UE 120. The measurement signals may include a synchronization signal block (SSB), a channel state information reference signal (CSI-RS), a pathloss reference signal, or a sounding reference signal (SRS). In some aspects, the updated beam or measurement configuration is associated with a timing advance change from the base station 110. In some aspects, the updated beam or measurement configuration is associated with a measurement configuration change or a measurement reporting change for the UE 120 from the base station 110. In some aspects, the updated beam or measurement configuration is associated with a beam or panel change for the UE 120 at a rate that satisfies a threshold.

In some aspects, the base station 110 transmits a MAC-CE message indicating the updated beam or measurement configuration. For example, the MAC-CE message may indicate a TCI state to be activated (e.g., a TCI state associated with the beam indicated by the UE 120) or a TCI state to be deactivated (e.g., a current active TCI state associated with the UE 120).

In some aspects, the base station 110 transmits downlink control information (DCI) indicating the updated beam or measurement configuration. For example, the DCI may indicate a TCI state to be activated (e.g., a TCI state associated with the beam indicated by the UE 120) or a TCI state to be deactivated (e.g., a current active TCI state associated with the UE 120).

As shown by reference number 330, the UE 120 may perform a beam change based at least in part on the updated beam or measurement configuration. Alternatively, and/or additionally, the UE 120 may perform antenna panel switching or measure a different set of beams based at least in part on the updated beam or measurement configuration. In some aspects, the UE 120 may communicate with the base station 110 based at least in part on performing the beam change.

As indicated above, FIG. 3 is provided as an example. Other examples may differ from what is described with respect to FIG. 3.

FIG. 4 is a diagram illustrating an example 400 associated with UE XR information-based beam management, in accordance with the present disclosure. As shown in FIG. 4, a base station 110 and a UE 120 may communicate with one another. In some aspects, the base station 110 and the UE 120 may be included in a wireless network, such as wireless network 100.

As shown by reference number 405, the UE 120 may obtain orientation information. In some aspects, the UE 120 may obtain orientation information indicating a current orientation of the UE 120 in a manner similar to that described elsewhere herein.

As shown by reference number 410, the UE 120 may determine a predicted orientation of the UE 120. In some aspects, the UE 120 may determine the predicted orientation of the UE 120 in a manner similar to that described elsewhere herein.

As shown by reference number 415, the UE 120 may determine beam information associated with the predicted orientation. In some aspects, the UE 120 may determine the beam information associated with the predicted orientation or a beam associated with the predicted orientation in a manner similar to that described elsewhere herein.

As shown by reference number 420, the UE 120 may perform a beam change based at least in part on the beam information. In some aspects, the UE 120 may predict a degradation of a performance of a current beam associated with a downlink channel associated with the UE 120 based at least in part on the beam information. The UE 120 may perform a beam change to receive data via the beam associated with the predicted orientation based at least in part on predicting the degradation of the performance of the current beam associated with the downlink channel.

As shown by reference number 425, the UE 120 may transmit, and the base station 110 may receive, an indication of the beam change. In some aspects, the UE 120 may transmit the indication of the beam change via dedicated signaling in a manner similar to that described elsewhere herein.

In some aspects, the indication of the beam change may also request updated beam or beam measurement configuration (e.g., for a beam associated with an uplink channel). The request for updated beam or beam measurement configuration may include an indication of a beam associated with the predicted orientation as described elsewhere herein.

As indicated above, FIG. 4 is provided as an example. Other examples may differ from what is described with respect to FIG. 4.

Figure 5:
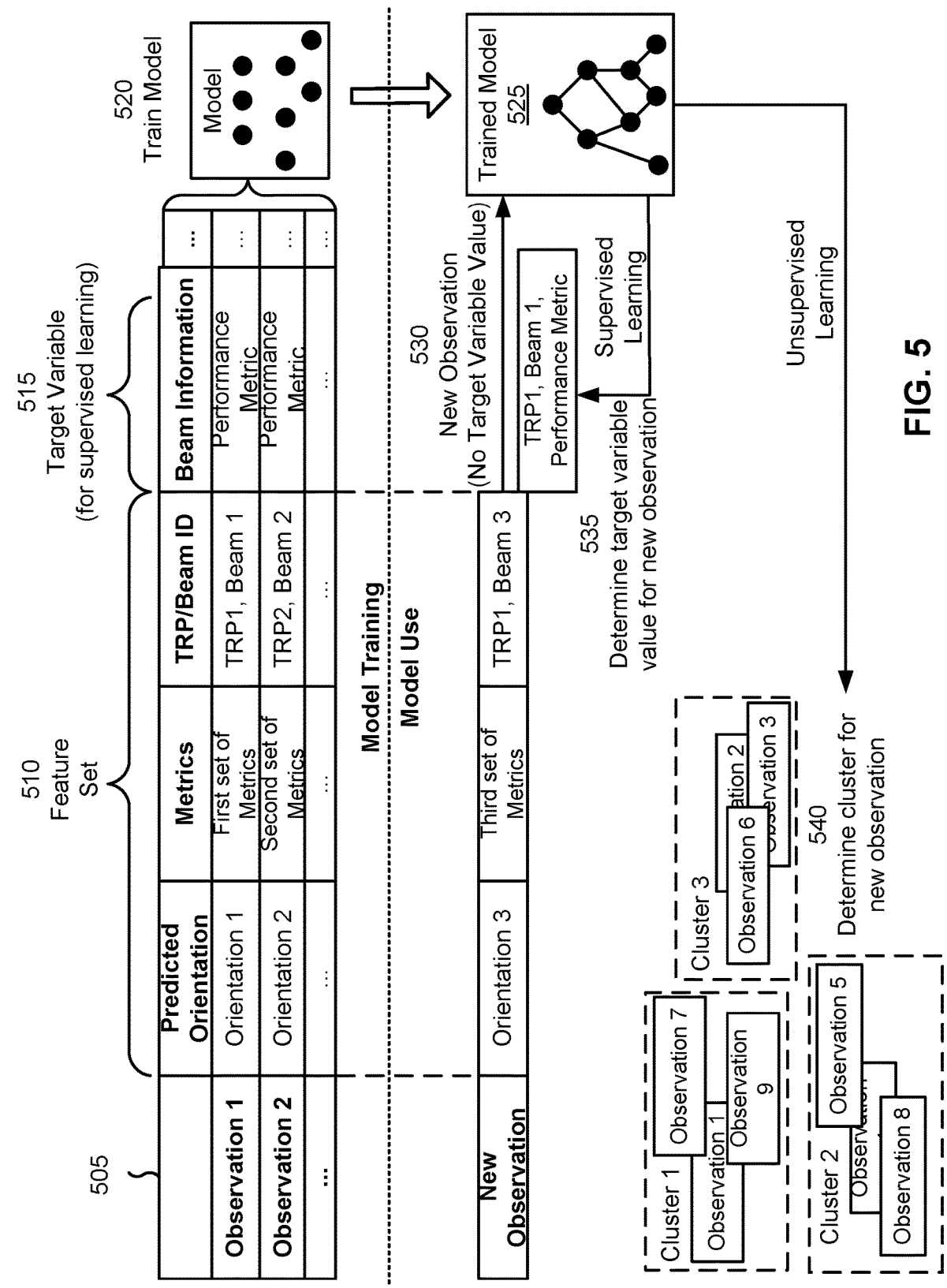
FIG. 5 is a diagram illustrating an example of training and using an artificial intelligence (AI) model in connection with UE XR information-based beam management, in accordance with the present disclosure.

FIG. 5 is a diagram illustrating an example 500 of training and using an AI model (e.g., a machine learning model) in connection with UE orientation-based beam updating. The machine learning model training and usage described herein may be performed using a machine learning system. The machine learning system may include or may be included in the UE 120, the base station 110, a computing device, a server, a cloud computing environment, or the like.

As shown by reference number 505, a machine learning model may be trained using a set of observations. The set of observations may be obtained from training data (e.g., historical data), such as data gathered during one or more processes described herein. In some implementations, the machine learning system may receive the set of observations (e.g., as input) from the UE 120, as described elsewhere herein.

As shown by reference number 510, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the UE 120. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a predicted orientation, a second feature of metrics (e.g., metrics indicating a performance of a beam at the predicted orientation), a third feature of TRP/Beam ID indicating a TRP or the beam associated with the metrics, and so on. As shown, for a first observation, the first feature may have a value of orientation 1, the second feature may have a value of first set of metrics, the third feature may have a value of TRP1, Beam 1, and so on. These features and feature values are provided as examples and may differ in other examples. For example, machine learning model may be trained to determine the predicted orientation of the UE 120 and the feature set may include a current orientation of the UE 120 or a rate of change of the orientation of the UE 120.

As shown by reference number 515, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 500, the target variable is beam information, which has a value of performance metric (e.g., a predicted performance of the beam at the predicted orientation) for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 520, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 525 to be used to analyze new observations.

As shown by reference number 530, the machine learning system may apply the trained machine learning model 525 to a new observation, such as by receiving a new observation and inputting the new observation to the trained machine learning model 525. As shown, the new observation may include a first feature of predicted orientation, a second feature of metrics, a third feature of TRP/Beam ID, and so on, as an example. The machine learning system may apply the trained machine learning model 525 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 525 may predict a value of TRP1, Beam 1, Performance metric indicating a beam associated with the predicted orientation and beam information for the beam for the target variable of beam information for the new observation, as shown by reference number 535. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 525 may classify (e.g., cluster) the new observation in a cluster, as shown by reference number 540. The observations within a cluster may have a threshold degree of similarity. As an example, if the machine learning system classifies the new observation in a first cluster (e.g., a cluster associated with a particular beam, a particular TRP, or a particular TCI state), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a cluster associated with another beam, another TRP, or another TCI state), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In this way, the machine learning system may apply a rigorous and automated process to UE orientation-based beam updating. The machine learning system enables recognition and/or identification of tens, hundreds, thousands, or millions of features and/or feature values for tens, hundreds, thousands, or millions of observations, thereby increasing accuracy and consistency and reducing delay associated with beam updating relative to performing beam updating based at least in part on a current orientation of the UE 120.

As indicated above, FIG. 5 is provided as an example. Other examples may differ from what is described in connection with FIG. 5.

Figure 6:
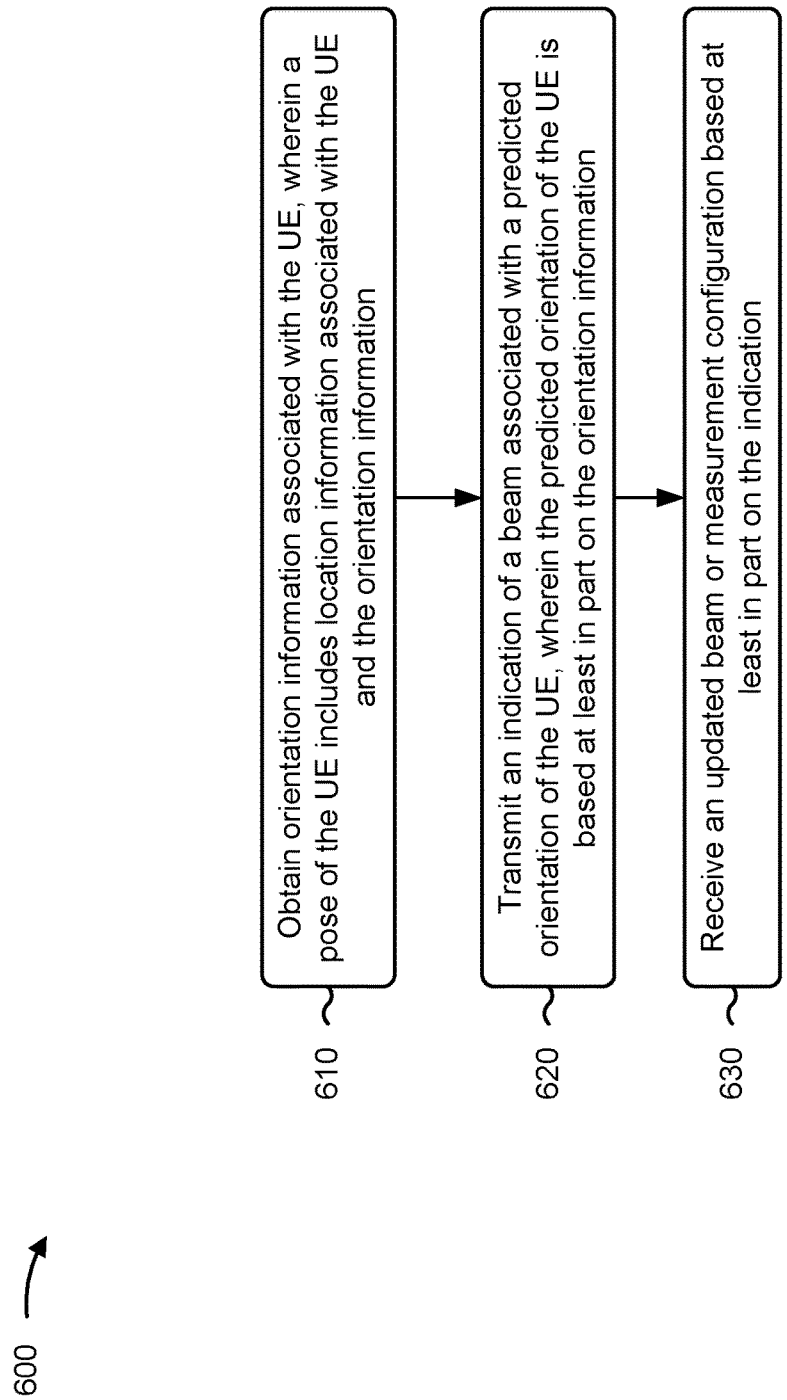
FIGS. 6 and 7 are diagrams illustrating example processes associated with UE XR information-based beam management, in accordance with the present disclosure.

FIG. 6 is a diagram illustrating an example process 600 performed, for example, by a UE, in accordance with the present disclosure. Example process 600 is an example where the UE (e.g., UE 120) performs operations associated with UE XR information-based beam management.

As shown in FIG. 6, in some aspects, process 600 may include obtaining orientation information associated with the UE, wherein a pose of the UE includes location information associated with the UE and the orientation information (block 610). For example, the UE (e.g., using communication manager 140 and/or sensor component 808, depicted in FIG. 8) may obtain orientation information associated with the UE, wherein a pose of the UE includes location information associated with the UE and the orientation information, as described above, for example, with reference to FIGS. 3 and/or 4.

As further shown in FIG. 6, in some aspects, process 600 may include transmitting an indication of a beam associated with a predicted orientation of the UE, wherein the predicted orientation of the UE is based at least in part on the orientation information (block 620). For example, the UE (e.g., using communication manager 140 and/or transmission component 804, depicted in FIG. 8) may transmit an indication of a beam associated with a predicted orientation of the UE, wherein the predicted orientation of the UE is based at least in part on the orientation information, as described above, for example, with reference to FIGS. 3, 4, and/or 5.

As further shown in FIG. 6, in some aspects, process 600 may include receiving an updated beam or measurement configuration based at least in part on the indication (block 630). For example, the UE (e.g., using communication manager 140 and/or reception component 802, depicted in FIG. 8) may receive an updated beam or measurement configuration based at least in part on the indication, as described above, for example, with reference to FIGS. 3 and/or 4.

Process 600 may include additional aspects, such as any single aspect or any combination of aspects described below and/or in connection with one or more other processes described elsewhere herein.

In a first aspect, the orientation information includes data obtained by one or more of a camera associated with the UE or a sensor associated with the UE.

In a second aspect, alone or in combination with the first aspect, the sensor associated with the UE includes one or more of a gyroscope or an accelerometer.

In a third aspect, alone or in combination with one or more of the first and second aspects, the predicted orientation of the UE is associated with a time that occurs at least 25 milliseconds after a time associated with the orientation information.

In a fourth aspect, alone or in combination with one or more of the first through third aspects, the predicted orientation of the UE is associated with a time that occurs at least 100 milliseconds after a time associated with the orientation information.

In a fifth aspect, alone or in combination with one or more of the first through fourth aspects, the predicted orientation of the UE is determined based at least in part on one or more of a round trip time associated with communicating data between the UE and a server device or an application associated with the orientation information.

In a sixth aspect, alone or in combination with one or more of the first through fifth aspects, the UE includes an untethered HMD that includes one or more millimeter wave antennas.

In a seventh aspect, alone or in combination with one or more of the first through sixth aspects, the predicted orientation of the UE indicates one or more of a predicted degradation of an uplink channel, a predicted degradation of a downlink channel, a predicted degradation of a TCI state, or a predicted degradation of a spatial relationship.

In an eighth aspect, alone or in combination with one or more of the first through seventh aspects, process 600 includes changing from a first beam to a second beam based at least in part on the predicted orientation of the UE and communicating via the second beam based at least in part on changing from the first beam to the second beam.

In a ninth aspect, alone or in combination with one or more of the first through eighth aspects, process 600 includes utilizing a model to determine the predicted orientation based at least in part on the orientation information.

In a tenth aspect, alone or in combination with one or more of the first through ninth aspects, the model includes a lookup table that is indexed based at least in part on one or more of the orientation information, a rate of change of an orientation of the UE, or beam information.

In an eleventh aspect, alone or in combination with one or more of the first through tenth aspects, the model includes an artificial intelligence model.

In a twelfth aspect, alone or in combination with one or more of the first through eleventh aspects, the model is trained based at least in part on UE and base station antenna mapping using angle of arrival estimation.

In a thirteenth aspect, alone or in combination with one or more of the first through twelfth aspects, the model is updated based at least in part on the orientation information and based at least in part on one or more metrics associated with communicating via the beam associated with the predicted orientation.

In a fourteenth aspect, alone or in combination with one or more of the first through thirteenth aspects, the one or more metrics associated with the beam include one or more of an RSRP or an error rate.

In a fifteenth aspect, alone or in combination with one or more of the first through fourteenth aspects, process 600 includes receiving a codebook that includes beam layout information, beam width information, and beam orientation information, and determining the beam associated with the predicted orientation based at least in part on the codebook.

In a sixteenth aspect, alone or in combination with one or more of the first through fifteenth aspects, process 600 includes receiving antenna configuration information that indicates a configuration of one or more antennas of a base station, and determining the beam associated with the predicted orientation based at least in part on the antenna configuration information.

In a seventeenth aspect, alone or in combination with one or more of the first through sixteenth aspects, process 600 includes storing information indicating orientations of the UE and metrics associated with communicating via particular beams associated with the orientations, and generating a mapping between the orientations of the UE and the particular beams based at least in part on the metrics, wherein the beam associated with the predicted orientation is determined based at least in part on the mapping.

In an eighteenth aspect, alone or in combination with one or more of the first through seventeenth aspects, the indication of the beam includes an indication of a TCI state of a plurality of TCI states pre-configured by a base station.

In a nineteenth aspect, alone or in combination with one or more of the first through eighteenth aspects, the indication of the beam includes an indication of a plurality of TCI states pre-configured by a base station, wherein the plurality of TCI states are ordered based at least in part on a predicted metric associated with each of the plurality TCI states.

In a twentieth aspect, alone or in combination with one or more of the first through nineteenth aspects, the indication of the beam includes an indication of a time at which a change to the beam associated with the predicted orientation is to occur.

In a twenty-first aspect, alone or in combination with one or more of the first through twentieth aspects, the indication of the beam is transmitted via dedicated signaling.

In a twenty-second aspect, alone or in combination with one or more of the first through twenty-first aspects, the dedicated signaling includes a PUCCH format associated with transmitting the indication of the beam.

In a twenty-third aspect, alone or in combination with one or more of the first through twenty-second aspects, the dedicated signaling is configured to be transmitted periodically.

In a twenty-fourth aspect, alone or in combination with one or more of the first through twenty-third aspects, the dedicated signaling is configured to be transmitted aperiodically.

In a twenty-fifth aspect, alone or in combination with one or more of the first through twenty-fourth aspects, the indication of the beam is transmitted via a scheduling request message.

In a twenty-sixth aspect, alone or in combination with one or more of the first through twenty-fifth aspects, the indication of the beam is transmitted via a physical uplink shared channel (PUSCH) message.

In a twenty-seventh aspect, alone or in combination with one or more of the first through twenty-sixth aspects, the indication of the beam is transmitted via a beam report.

In a twenty-eighth aspect, alone or in combination with one or more of the first through twenty-seventh aspects, the beam report includes one or more of a first field indicating one or more TCI states, a second field indicating the beam associated with the predicted orientation, a third field indicating a time associated with changing from a current beam to the beam associated with the predicted orientation, a fourth field indicating a transmission reception point, or a fifth field indicating whether the one or more TCI states are ordered based at least in part on one or more metrics associated with the one or more TCI states.

In a twenty-ninth aspect, alone or in combination with one or more of the first through twenty-eighth aspects, the updated beam or measurement configuration includes a MAC-CE message indicating one or more of a TCI state to be activated, or a TCI state to be deactivated.

In a thirtieth aspect, alone or in combination with one or more of the first through twenty-ninth aspects, the updated beam or measurement configuration includes DCI indicating a TCI state to be activated.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
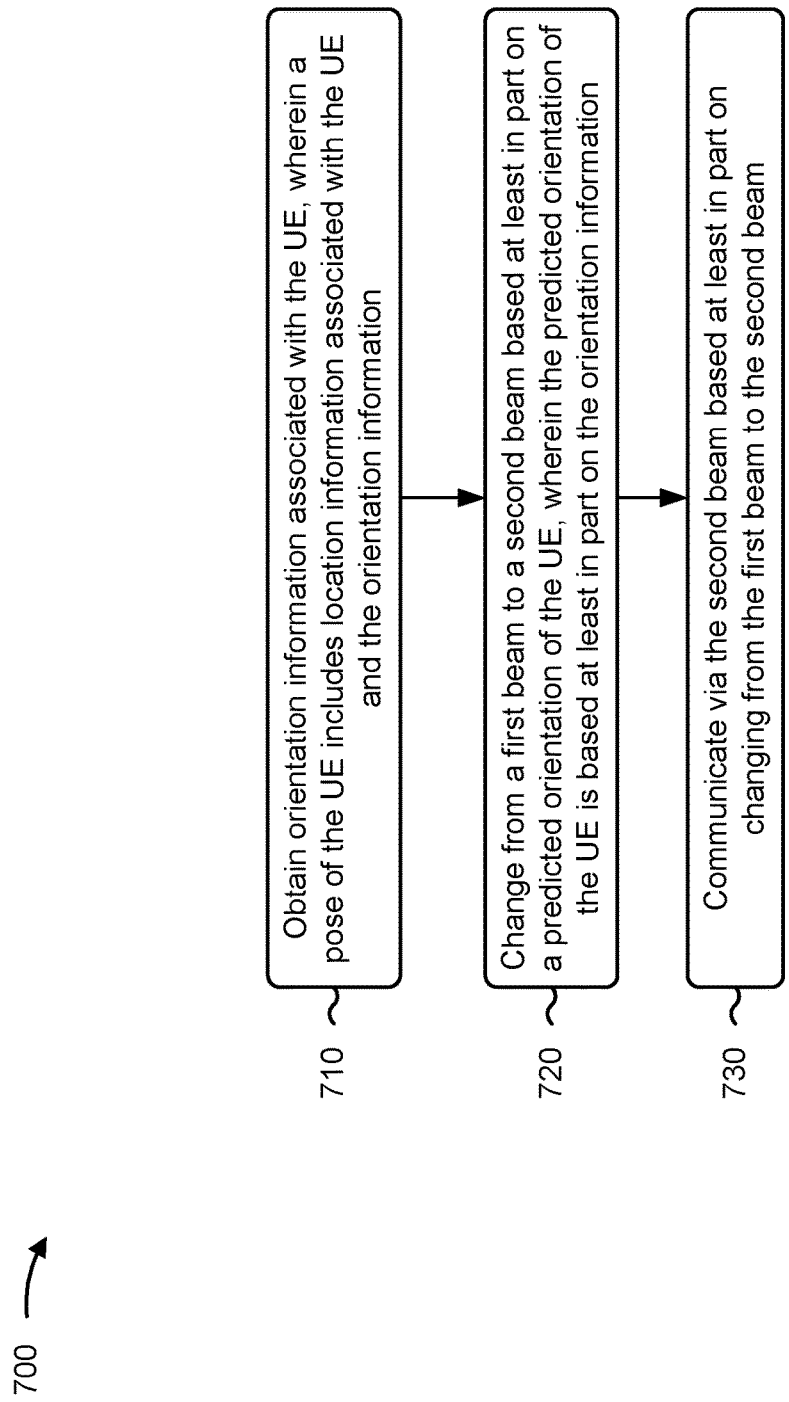

FIG. 7 is a diagram illustrating an example process 700 performed, for example, by a UE, in accordance with the present disclosure. Example process 700 is an example where the UE (e.g., UE 120) performs operations associated with UE XR information-based beam management.

As shown in FIG. 7, in some aspects, process 700 may include obtaining orientation information associated with the UE, wherein a pose of the UE includes location information associated with the UE and the orientation information (block 710). For example, the UE (e.g., using communication manager 140 and/or sensor component 908, depicted in FIG. 9) may obtain orientation information associated with the UE, wherein a pose of the UE includes location information associated with the UE and the orientation information, as described above, for example, with reference to FIGS. 3 and/or 4.

As further shown in FIG. 7, in some aspects, process 700 may include changing from a first beam to a second beam based at least in part on a predicted orientation of the UE, wherein the predicted orientation of the UE is based at least in part on the orientation information (block 720). For example, the UE (e.g., using communication manager 140 and/or beam change component 910, depicted in FIG. 9) may change from a first beam to a second beam based at least in part on a predicted orientation of the UE, wherein the predicted orientation of the UE is based at least in part on the orientation information, as described above, for example, with reference to FIGS. 3, 4, and/or 5.

As further shown in FIG. 7, in some aspects, process 700 may include communicating via the second beam based at least in part on changing from the first beam to the second beam (block 730). For example, the UE (e.g., using communication manager 140 and/or beam change component 910, depicted in FIG. 9) may communicate via the second beam based at least in part on changing from the first beam to the second beam, as described above, for example, with reference to FIGS. 3 and/or 4.

Process 700 may include additional aspects, such as any single aspect or any combination of aspects described below and/or in connection with one or more other processes described elsewhere herein.

In a first aspect, the orientation information includes data obtained by one or more of a camera associated with the UE or a sensor associated with the UE.

In a second aspect, alone or in combination with the first aspect, the sensor associated with the UE includes one or more of a gyroscope or an accelerometer.

In a third aspect, alone or in combination with one or more of the first and second aspects, the predicted orientation of the UE is associated with a time that occurs at least 25 milliseconds after a time associated with the orientation information.

In a fourth aspect, alone or in combination with one or more of the first through third aspects, the predicted orientation of the UE is associated with a time that occurs at least 100 milliseconds after a time associated with the orientation information.

In a fifth aspect, alone or in combination with one or more of the first through fourth aspects, the predicted orientation of the UE is determined based at least in part on one or more of a round trip time associated with communicating data between the UE and a server device or an application associated with the orientation information.

In a sixth aspect, alone or in combination with one or more of the first through fifth aspects, the UE includes an untethered HMD that includes one or more millimeter wave antennas.

In a seventh aspect, alone or in combination with one or more of the first through sixth aspects, the predicted orientation of the UE indicates one or more of a predicted degradation of an uplink channel, a predicted degradation of a downlink channel, a degradation of a TCI state, or a degradation of a spatial relationship.

In an eighth aspect, alone or in combination with one or more of the first through seventh aspects, process 700 includes transmitting an indication of a beam associated with the predicted orientation of the UE and receiving an updated beam or measurement configuration based at least in part on the indication.

In a ninth aspect, alone or in combination with one or more of the first through eighth aspects, process 700 includes utilizing a model to determine the predicted orientation based at least in part on the orientation information.

In a tenth aspect, alone or in combination with one or more of the first through ninth aspects, the model includes a lookup table that is indexed based at least in part on one or more of the orientation information, a rate of change of an orientation of the UE, or beam information.

In an eleventh aspect, alone or in combination with one or more of the first through tenth aspects, the model includes an artificial intelligence model.

In a twelfth aspect, alone or in combination with one or more of the first through eleventh aspects, the model is trained based at least in part on UE and base station antenna mapping using angle of arrival estimation.

In a thirteenth aspect, alone or in combination with one or more of the first through twelfth aspects, the model is updated based at least in part on the orientation information and based at least in part on one or more metrics associated with communicating via the beam associated with the predicted orientation.

In a fourteenth aspect, alone or in combination with one or more of the first through thirteenth aspects, the one or more metrics associated with the beam include one or more of an RSRP or an error rate.

In a fifteenth aspect, alone or in combination with one or more of the first through fourteenth aspects, process 700 includes receiving a codebook that includes beam layout information, beam width information, and beam orientation information, and changing from the first beam to the second beam based at least in part on the codebook.

In a sixteenth aspect, alone or in combination with one or more of the first through fifteenth aspects, process 700 includes receiving antenna configuration information that indicates a configuration of one or more antennas of a base station and changing from the first beam to the second beam based at least in part on the antenna configuration information.

In a seventeenth aspect, alone or in combination with one or more of the first through sixteenth aspects, process 700 includes storing information indicating orientations of the UE and metrics associated with communicating via particular beams associated with the orientations, and generating a mapping between the orientations of the UE and the particular beams based at least in part on the metrics, wherein the UE changes from the first beam to the second beam based at least in part on the mapping.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
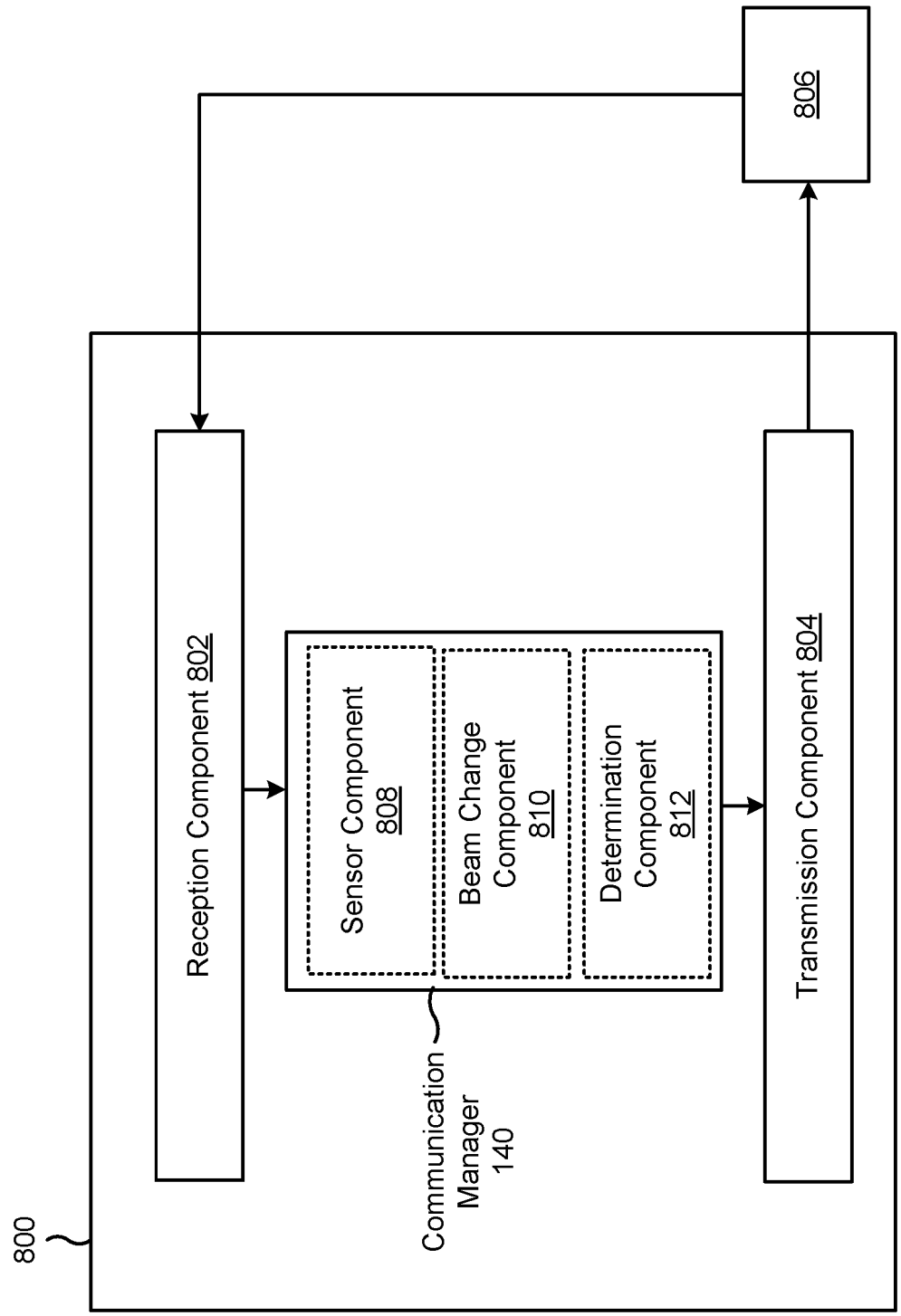
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a sensor component 808, a beam change component 810, or a determination component 812, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The sensor component 808 may obtain orientation information associated with the UE. The transmission component 804 may transmit an indication of a beam associated with a predicted orientation of the UE, wherein the predicted orientation of the UE is based at least in part on the orientation information. The reception component 802 may receive an updated beam or measurement configuration based at least in part on the indication.

The beam change component 810 may change from a first beam to a second beam based at least in part on the predicted orientation of the UE.

The reception component 802 or the transmission component 804 may communicate via the second beam based at least in part on changing from the first beam to the second beam.

The determination component 812 may utilize a model to determine the predicted orientation based at least in part on the orientation information.

The reception component 802 may receive a codebook that includes beam layout information, beam width information, and beam orientation information.

The determination component 812 may determine the beam associated with the predicted orientation based at least in part on the codebook.

The reception component 802 may receive antenna configuration information that indicates a configuration of one or more antennas of a base station.

The determination component 812 may determine the beam associated with the predicted orientation based at least in part on the antenna configuration information.

The beam change component 810 may store information indicating orientations of the UE and metrics associated with communicating via particular beams associated with the orientations.

The determination component 812 may generate a mapping between the orientations of the UE and the particular beams based at least in part on the metrics, wherein the beam associated with the predicted orientation is determined based at least in part on the mapping.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
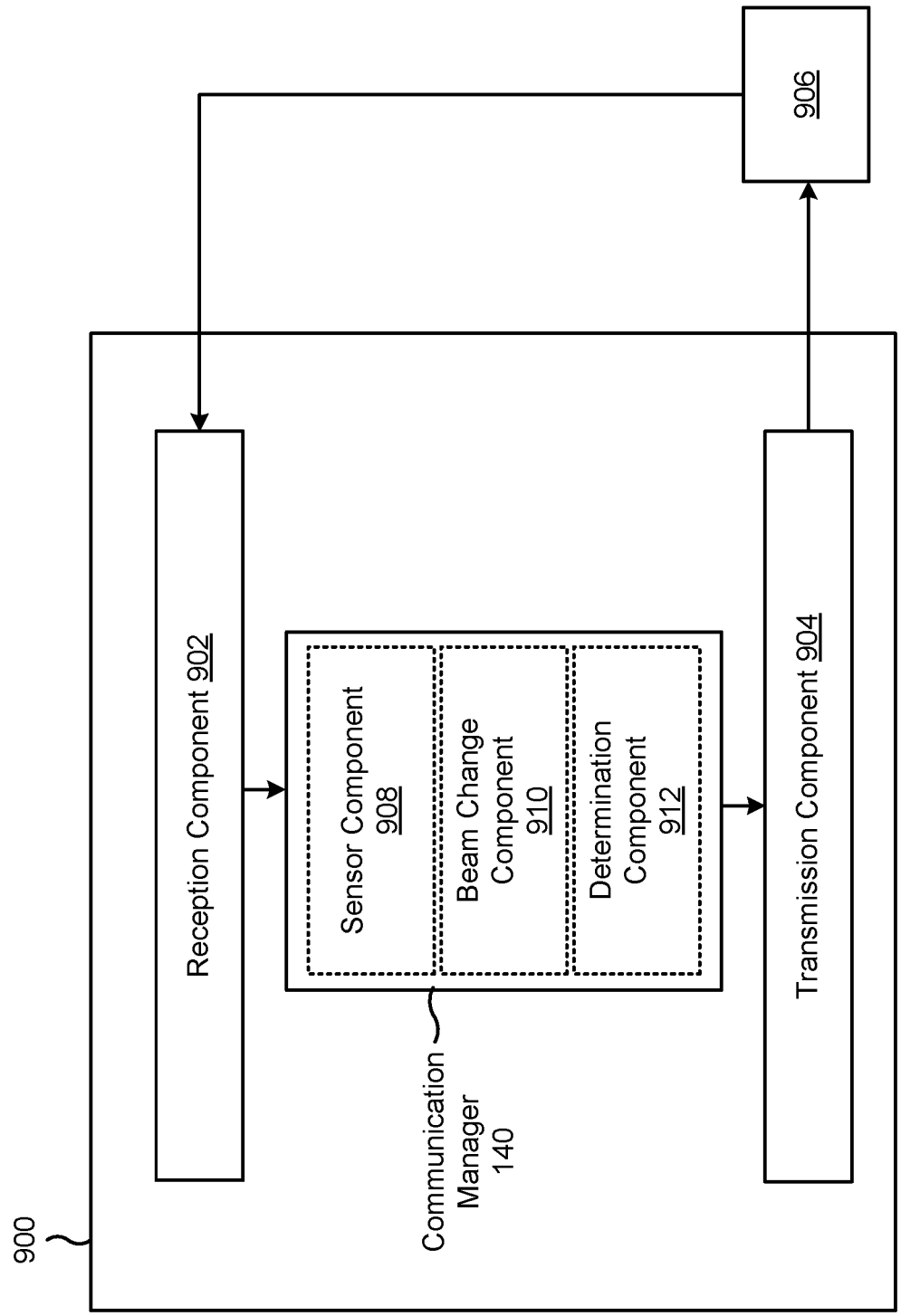

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a sensor component 908, a beam change component 910, or a determination component 912, among other examples.

In some aspects, the apparatus 900 may be configured to perform one or more operations described herein in connection with FIGS. 3-5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The sensor component 908 may obtain orientation information associated with the UE. The beam change component 910 may change from a first beam to a second beam based at least in part on a predicted orientation of the UE, wherein the predicted orientation of the UE is based at least in part on the orientation information. The reception component 902 or the transmission component 904 may communicate via the second beam based at least in part on changing from the first beam to the second beam.

The transmission component 904 may transmit an indication of a beam associated with the predicted orientation of the UE.

The reception component 902 may receive an updated beam or measurement configuration based at least in part on the indication.

The determination component 912 may utilize a model to determine the predicted orientation based at least in part on the orientation information.

The reception component 902 may receive a codebook that includes beam layout information, beam width information, and beam orientation information.

The beam change component 910 may change from the first beam to the second beam based at least in part on the codebook.

The reception component 902 may receive antenna configuration information that indicates a configuration of one or more antennas of a base station.

The beam change component 910 may change from the first beam to the second beam based at least in part on the antenna configuration information.

The determination component 912 may store information indicating orientations of the UE and metrics associated with communicating via particular beams associated with the orientations.

The determination component 912 may generate a mapping between the orientations of the UE and the particular beams based at least in part on the metrics, wherein the UE changes from the first beam to the second beam based at least in part on the mapping.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: obtaining orientation information associated with the UE, wherein a pose of the UE includes location information associated with the UE and the orientation information; transmitting an indication of a beam associated with a predicted orientation of the UE, wherein the predicted orientation of the UE is based at least in part on the orientation information; and receiving an updated beam or measurement configuration based at least in part on the indication.

Aspect 2: The method of Aspect 1, wherein the orientation information includes data obtained by one or more of a camera associated with the UE or a sensor associated with the UE.

Aspect 3: The method of Aspect 2, wherein the sensor associated with the UE includes one or more of a gyroscope or an accelerometer.

Aspect 4: The method of one or more of Aspects 1 through 3, wherein the predicted orientation of the UE is associated with a time that occurs after a time associated with the orientation information.

Aspect 5: The method of one or more of Aspects 1 through 4, wherein the predicted orientation of the UE is associated with a time that occurs at least 25 milliseconds after a time associated with the orientation information.

Aspect 6: The method of one or more of Aspects 1 through 5, wherein the predicted orientation of the UE is determined based at least in part on one or more of a round trip time associated with communicating data between the UE and a server device or an application associated with the orientation information.

Aspect 7: The method of one or more of Aspects 1 through 6, wherein the UE includes an untethered HMD that includes one or more millimeter wave antennas.

Aspect 8: The method of one or more of Aspects 1 through 7, wherein the predicted orientation of the UE indicates one or more of: a predicted degradation of an uplink channel, a predicted degradation of a downlink channel, a predicted degradation of a TCI state, or a predicted degradation of a spatial relationship.

Aspect 9: The method of one or more of Aspects 1 through 8, further comprising: changing from a first beam to a second beam based at least in part on the predicted orientation of the UE; and communicating via the second beam based at least in part on changing from the first beam to the second beam.

Aspect 10: The method of one or more of Aspects 1 through 9, further comprising: utilizing a model to determine the predicted orientation based at least in part on the orientation information.

Aspect 11: The method of Aspect 10, wherein the model includes a lookup table that is indexed based at least in part on one or more of the orientation information, a rate of change of an orientation of the UE, or beam information.

Aspect 12: The method of Aspect 10, wherein the model includes an artificial intelligence model.

Aspect 13: The method of Aspect 12, wherein the model is trained based at least in part on UE and base station antenna mapping using angle of arrival estimation.

Aspect 14: The method of Aspect 12, wherein the model is updated based at least in part on the orientation information and based at least in part on one or more metrics associated with communicating via the beam associated with the predicted orientation.

Aspect 15: The method of Aspect 14, wherein the one or more metrics associated with the beam include one or more of an RSRP or an error rate.

Aspect 16: The method of one or more of Aspects 1 through 15, further comprising: receiving a codebook that includes beam layout information, beam width information, and beam orientation information; and determining the beam associated with the predicted orientation based at least in part on the codebook.

Aspect 17: The method of one or more of Aspects 1 through 16, further comprising: receiving antenna configuration information that indicates a configuration of one or more antennas of a base station; and determining the beam associated with the predicted orientation based at least in part on the antenna configuration information.

Aspect 18: The method of one or more of Aspects 1 through 17, further comprising: storing information indicating orientations of the UE and metrics associated with communicating via particular beams associated with the orientations; and generating a mapping between the orientations of the UE and the particular beams based at least in part on the metrics, wherein the beam associated with the predicted orientation is determined based at least in part on the mapping.

Aspect 19: The method of one or more of Aspects 1 through 18, wherein the indication of the beam includes an indication of a TCI state of a plurality of TCI states pre-configured by a base station.

Aspect 20: The method of one or more of Aspects 1 through 19, wherein the indication of the beam includes an indication of a plurality of TCI states pre-configured by a base station, wherein the plurality of TCI states are ordered based at least in part on a predicted metric associated with each of the plurality TCI states.

Aspect 21: The method of one or more of Aspects 1 through 20, wherein the indication of the beam includes an indication of a time at which a change to the beam associated with the predicted orientation is to occur.

Aspect 22: The method of one or more of Aspects 1 through 21, wherein the indication of the beam is transmitted via dedicated signaling.

Aspect 23: The method of Aspect 22, wherein the dedicated signaling includes a PUCCH format associated with transmitting the indication of the beam.

Aspect 24: The method of Aspect 22, wherein the dedicated signaling is configured to be transmitted periodically.

Aspect 25: The method of Aspect 22, wherein the dedicated signaling is configured to be transmitted aperiodically.

Aspect 26: The method of one or more of Aspects 1 through 25, wherein the indication of the beam is transmitted via a scheduling request message.

Aspect 27: The method of one or more of Aspects 1 through 26, wherein the indication of the beam is transmitted via a PUSCH message.

Aspect 28: The method of one or more of Aspects 1 through 27, wherein the indication of the beam is transmitted via a beam report.

Aspect 29: The method of Aspect 28, wherein the beam report includes one or more of: a first field indicating one or more TCI states, a second field indicating the beam associated with the predicted orientation, a third field indicating a time associated with changing from a current beam to the beam associated with the predicted orientation, a fourth field indicating a transmission reception point, or a fifth field indicating whether the one or more TCI states are ordered based at least in part on one or more metrics associated with the one or more TCI states.

Aspect 30: The method of one or more of Aspects 1 through 29, wherein the updated beam or measurement configuration includes a MAC-CE message indicating one or more of: a TCI state to be activated, or a TCI state to be deactivated.

Aspect 31: The method of one or more of Aspects 1 through 30, wherein the updated beam or measurement configuration includes DCI indicating a TCI state to be activated.

Aspect 32: A method of wireless communication performed by a UE, comprising: obtaining orientation information associated with the UE; changing from a first beam to a second beam based at least in part on a predicted orientation of the UE, wherein the predicted orientation of the UE is based at least in part on the orientation information; and communicating via the second beam based at least in part on changing from the first beam to the second beam.

Aspect 33: The method of Aspect 32, wherein the orientation information includes data obtained by one or more of a camera associated with the UE or a sensor associated with the UE.

Aspect 34: The method of Aspect 33, wherein the sensor associated with the UE includes one or more of a gyroscope or an accelerometer.

Aspect 35: The method of one or more of Aspects 32 through 34, wherein the predicted orientation of the UE is associated with a time that occurs at least 25 milliseconds after a time associated with the orientation information.

Aspect 36: The method of one or more of Aspects 32 through 35, wherein the predicted orientation of the UE is associated with a time that occurs at least 100 milliseconds after a time associated with the orientation information.

Aspect 37: The method of one or more of Aspects 32 through 36, wherein the predicted orientation of the UE is determined based at least in part on one or more of a round trip time associated with communicating data between the UE and a server device or an application associated with the orientation information.

Aspect 38: The method of one or more of Aspects 32 through 37, wherein the UE includes an untethered HMD that includes one or more millimeter wave antennas.

Aspect 39: The method of one or more of Aspects 32 through 38, wherein the predicted orientation of the UE indicates one or more of: a predicted degradation of an uplink channel, a predicted degradation of a downlink channel, a degradation of a TCI state, or a degradation of a spatial relationship.

Aspect 40: The method of one or more of Aspects 32 through 39, further comprising: transmitting an indication of a beam associated with the predicted orientation of the UE; and receiving an updated beam or measurement configuration based at least in part on the indication.

Aspect 41: The method of one or more of Aspects 32 through 40, further comprising: utilizing a model to determine the predicted orientation based at least in part on the orientation information.

Aspect 42: The method of Aspect 41, wherein the model includes a lookup table that is indexed based at least in part on one or more of the orientation information, a rate of change of an orientation of the UE, or beam information.

Aspect 43: The method of Aspect 41, wherein the model includes an artificial intelligence model.

Aspect 44: The method of Aspect 43, wherein the model is trained based at least in part on UE and base station antenna mapping using angle of arrival estimation.

Aspect 45: The method of Aspect 43, wherein the model is updated based at least in part on the orientation information and based at least in part on one or more metrics associated with communicating via the beam associated with the predicted orientation.

Aspect 46: The method of Aspect 45, wherein the one or more metrics associated with the beam include one or more of an RSRP or an error rate.

Aspect 47: The method of one or more of Aspects 32 through 46, further comprising: receiving a codebook that includes beam layout information, beam width information, and beam orientation information; and changing from the first beam to the second beam based at least in part on the codebook.

Aspect 48: The method of one or more of Aspects 32 through 47, further comprising: receiving antenna configuration information that indicates a configuration of one or more antennas of a base station; and changing from the first beam to the second beam based at least in part on the antenna configuration information.

Aspect 49: The method of one or more of Aspects 32 through 48, further comprising: storing information indicating orientations of the UE and metrics associated with communicating via particular beams associated with the orientations; and generating a mapping between the orientations of the UE and the particular beams based at least in part on the metrics, wherein the UE changes from the first beam to the second beam based at least in part on the mapping.

Aspect 50: An apparatus for wireless communication at a device, comprising a processor; memory coupled with the processor; and instructions stored in the memory and executable by the processor to cause the apparatus to perform the method of one or more of Aspects 1 through 31.

Aspect 51: A device for wireless communication, comprising a memory and one or more processors coupled to the memory, the one or more processors configured to perform the method of one or more of Aspects 1 through 31.

Aspect 52: An apparatus for wireless communication, comprising at least one means for performing the method of one or more of Aspects 1 through 31.

Aspect 53: A non-transitory computer-readable medium storing code for wireless communication, the code comprising instructions executable by a processor to perform the method of one or more of Aspects 1 through 31.

Aspect 54: A non-transitory computer-readable medium storing a set of instructions for wireless communication, the set of instructions comprising one or more instructions that, when executed by one or more processors of a device, cause the device to perform the method of one or more of Aspects 1 through 31.

Aspect 55: An apparatus for wireless communication at a device, comprising a processor; memory coupled with the processor; and instructions stored in the memory and executable by the processor to cause the apparatus to perform the method of one or more of Aspects 32 through 49.

Aspect 56: A device for wireless communication, comprising a memory and one or more processors coupled to the memory, the one or more processors configured to perform the method of one or more of Aspects 32 through 49.

Aspect 57: An apparatus for wireless communication, comprising at least one means for performing the method of one or more of Aspects 32 through 49.

Aspect 58: A non-transitory computer-readable medium storing code for wireless communication, the code comprising instructions executable by a processor to perform the method of one or more of Aspects 32 through 49.

Aspect 59: A non-transitory computer-readable medium storing a set of instructions for wireless communication, the set of instructions comprising one or more instructions that, when executed by one or more processors of a device, cause the device to perform the method of one or more of Aspects 32 through 49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   obtain orientation information associated with the UE,
      wherein a pose of the UE includes location information associated with the UE and the orientation information;
   utilize a model to determine a predicted orientation of the UE based at least in part on the orientation information,
      wherein the model includes a lookup table that is indexed based at least in part on a rate of change of an orientation of the UE;
   transmit an indication of a beam associated with the predicted orientation of the UE,
      wherein the predicted orientation of the UE is based at least in part on the orientation information and a round trip time associated with communicating data between the UE and a network node; and
   receive an updated beam or measurement configuration based at least in part on the indication.

2. The UE of claim 1, wherein the orientation information includes data obtained by one or more of a camera associated with the UE, a gyroscope associated with the UE, or an accelerometer associated with the UE.

3. The UE of claim 1, wherein the predicted orientation of the UE is associated with a time that occurs after a time associated with the orientation information.

4. The UE of claim 1, wherein the predicted orientation of the UE is further based at least in part on an application associated with the orientation information.

5. The UE of claim 1, wherein the UE includes an untethered head movement device (HMD) that includes one or more millimeter wave antennas.

6. The UE of claim 1, wherein the predicted orientation of the UE indicates one or more of:
   a predicted degradation of an uplink channel,
   a predicted degradation of a downlink channel
   a predicted degradation of a transmission configuration indicator (TCI) state, or
   a predicted degradation of a spatial relationship.

7. The UE of claim 1, wherein the one or more processors are further configured to:
   change from a first beam to a second beam based at least in part on the predicted orientation of the UE; and
   communicate via the second beam based at least in part on changing from the first beam to the second beam.

8. The UE of claim 1,
   wherein the lookup table is further indexed based at least in part on one or more of the orientation information, or beam information.

9. The UE of claim 8, wherein the model is trained based at least in part on UE and base station antenna mapping using angle of arrival estimation.

10. The UE of claim 8, wherein the model is updated based at least in part on the orientation information and based at least in part on one or more metrics associated with communicating via the beam associated with the predicted orientation, and
   wherein the one or more metrics associated with the beam include one or both of a reference signal received power (RSRP) or an error rate.

11. The UE of claim 1, wherein the one or more processors are further configured to:
   receive a codebook that includes beam layout information, beam width information, and beam orientation information; and
   determine the beam associated with the predicted orientation based at least in part on the codebook.

12. The UE of claim 1, wherein the one or more processors are further configured to:
   receive antenna configuration information that indicates a configuration of one or more antennas of a base station; and
   determine the beam associated with the predicted orientation based at least in part on the antenna configuration information.

13. The UE of claim 1, wherein the one or more processors are further configured to:
   store information indicating orientations of the UE and metrics associated with communicating via particular beams associated with the orientations; and
   generate a mapping between the orientations of the UE and the particular beams based at least in part on the metrics, wherein the beam associated with the predicted orientation is determined based at least in part on the mapping, wherein the indication of the beam includes an indication of a transmission configuration indicator (TCI) state of a plurality of TCI states pre-configured by a base station, and wherein the base station includes one or more transmission reception points (TRPs).

14. The UE of claim 1, wherein the indication of the beam includes an indication of a plurality of transmission configuration indicator (TCI) states pre-configured by a base station, wherein the plurality of TCI states are ordered based at least in part on a predicted metric associated with each of the plurality of TCI states.

15. The UE of claim 1, wherein:
   the indication of the beam includes an indication of a time at which a change to the beam associated with the predicted orientation is to occur,
   the indication of the beam is transmitted via dedicated signaling,
   the indication of the beam is transmitted via dedicated signaling that includes a physical uplink control channel (PUCCH) format associated with transmitting the indication of the beam,
   the indication of the beam is transmitted via dedicated signaling that is configured to be transmitted periodically,
   the indication of the beam is transmitted via dedicated signaling that is configured to be transmitted aperiodically,
   the indication of the beam is transmitted via a scheduling request message,
   the indication of the beam is transmitted via a physical uplink shared channel (PUSCH) message, or
   the beam report further includes one or more of:
      a first field indicating one or more transmission configuration indicator (TCI) states,
      a second field indicating the beam associated with the predicted orientation,
      a third field indicating a time associated with changing from a current beam to the beam associated with the predicted orientation, or a fourth field indicating whether the one or more TCI states are ordered based at least in part on one or more metrics associated with the one or more TCI states, or any combination thereof.

16. The UE of claim 1, wherein the updated beam or measurement configuration includes:
a media access control-control element (MAC-CE) message indicating one or both of: a transmission configuration indicator (TCI) state to be activated, or a TCI state to be deactivated, or
downlink control information (DCI) indicating a transmission configuration indicator (TCI) state to be activated.

17. A user equipment (UE) for wireless communication, comprising:
a memory; and one or more processors, coupled to the memory, configured to:
obtain orientation information associated with the UE, wherein a pose of the UE includes location information associated with the UE and the orientation information;
utilize a model to determine a predicted orientation of the UE based at least in part on the orientation information, wherein the model includes a lookup table that is indexed based at least in part on a rate of change of an orientation of the UE;
change from a first beam to a second beam based at least in part on the predicted orientation of the UE,
wherein the predicted orientation of the UE is based at least in part on the orientation information and a round trip time associated with communicating data between the UE and a network node; and
communicate via the second beam based at least in part on changing from the first beam to the second beam.

18. The UE of claim 17, wherein the orientation information includes data obtained by one or more of a camera associated with the UE, a gyroscope associated with the UE, or an accelerometer associated with the UE.

19. The UE of claim 17, wherein the predicted orientation of the UE is associated with a time that occurs after a time associated with the orientation information.

20. The UE of claim 17, wherein the predicted orientation of the UE is further based at least in part on an application associated with the orientation information.

21. The UE of claim 17, wherein the UE includes an untethered head mounted display (HMD) that includes one or more millimeter wave antennas.

22. The UE of claim 17, wherein the predicted orientation of the UE indicates one or more of:
a predicted degradation of an uplink channel,
a predicted degradation of a downlink channel,
a degradation of a transmission configuration indicator (TCI) state, or
a degradation of a spatial relationship.

23. The UE of claim 17, wherein the one or more processors are further configured to:
transmit an indication of a beam associated with the predicted orientation of the UE; and
receive an updated beam or measurement configuration based at least in part on the indication.

24. The UE of claim 17,
wherein the lookup table is further indexed based at least in part on one or more of the orientation information, or beam information.

25. The UE of claim 24, wherein the model includes the AI model, and wherein the AI model is trained based at least in part on UE and base station antenna mapping using angle of arrival estimation or the AI model is updated based at least in part on the orientation information and based at least in part on one or more metrics associated with communicating via the beam associated with the predicted orientation.

26. The UE of claim 17, wherein the one or more processors are further configured to:
receive one or both of a codebook that includes beam layout information, beam width information, and beam orientation information, or antenna configuration information indicating a configuration of one or more antennas of a base station; and
change from the first beam to the second beam based at least in part on one or both of the codebook or the antenna configuration information.

27. The UE of claim 17, wherein the one or more processors are further configured to:
store information indicating orientations of the UE and metrics associated with communicating via particular beams associated with the orientations; and
generate a mapping between the orientations of the UE and the particular beams based at least in part on the metrics, wherein the UE changes from the first beam to the second beam based at least in part on the mapping.

28. A method of wireless communication performed by a user equipment (UE), comprising:
obtaining orientation information associated with the UE, wherein a pose of the UE includes location information associated with the UE and the orientation information;
utilize a model to determine a predicted orientation of the UE based at least in part on the orientation information, wherein the model includes a lookup table that is indexed based at least in part on a rate of change of an orientation of the UE;
transmitting an indication of a beam associated with the predicted orientation of the UE,
wherein the predicted orientation of the UE is based at least in part on the orientation information and a round trip time associated with communicating data between the UE and a network node; and
receiving an updated beam or measurement configuration based at least in part on the indication.

29. The method of claim 28, further comprising:
changing from a first beam to a second beam based at least in part on the predicted orientation of the UE; and
communicating via the second beam based at least in part on changing from the first beam to the second beam.

30. A method of wireless communication performed by a user equipment (UE), comprising:
obtaining orientation information associated with the UE, wherein a pose of the UE includes location information associated with the UE and the orientation information;
utilize a model to determine a predicted orientation based at least in part on the orientation information, wherein the model includes a lookup table that is indexed based at least in part on a rate of change of an orientation of the UE;
changing from a first beam to a second beam based at least in part on the predicted orientation of the UE,
wherein the predicted orientation of the UE is based at least in part on the orientation information and a round trip time associated with communicating data between the UE and a network node; and
communicating via the second beam based at least in part on changing from the first beam to the second beam.

* * * * *